May 12, 1953 — E. G. RAGATZ — 2,638,437
METHOD AND APPARATUS FOR TREATING HYDROCARBONS
Filed July 30, 1951
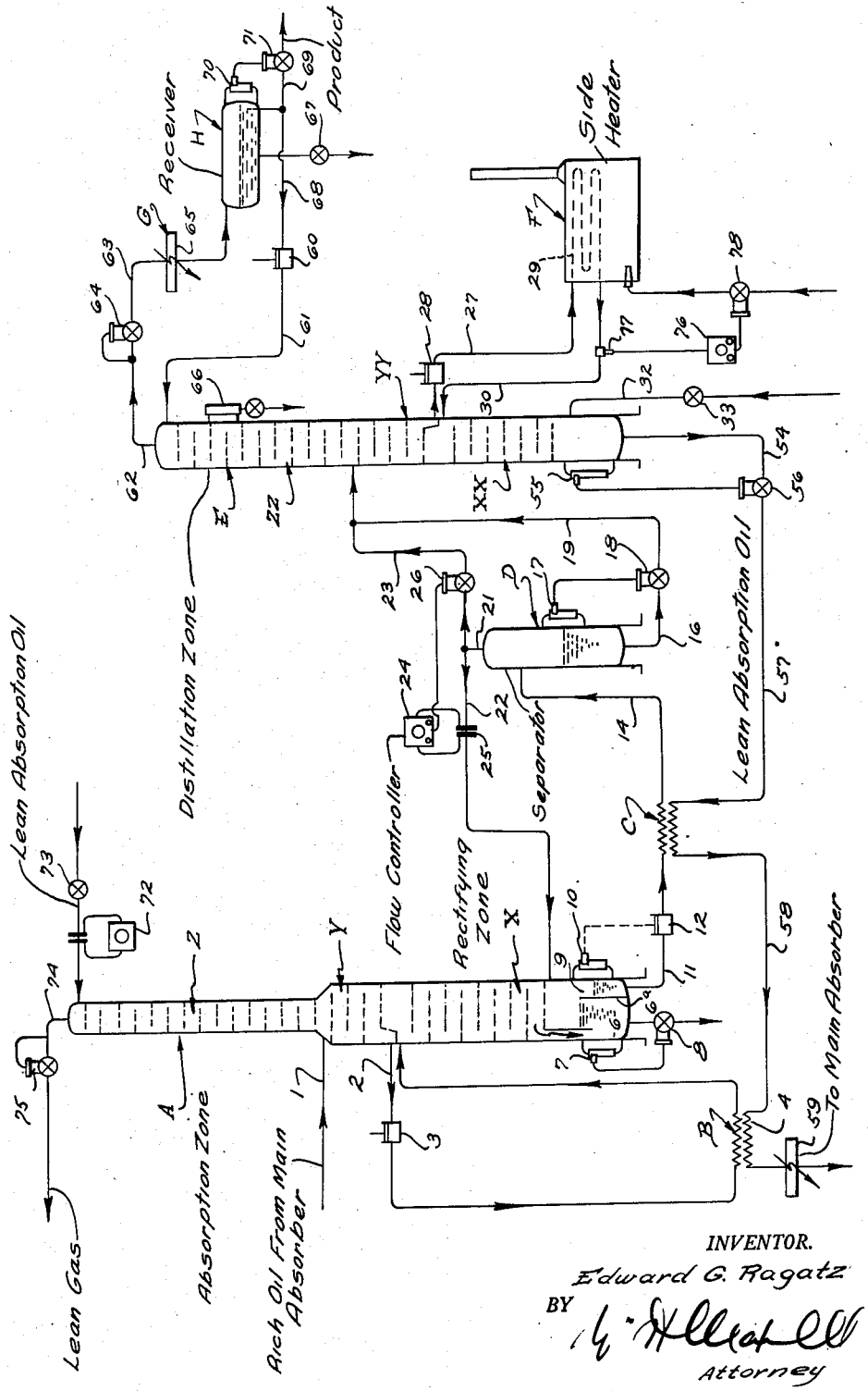
INVENTOR.
Edward G. Ragatz
BY
Attorney Patented May 12, 1953

2,638,437

UNITED STATES PATENT OFFICE 2,638,437

METHOD AND APPARATUS FOR TREATING HYDROCARBONS

Edward G. Ragatz, San Marino, Calif., assignor to Edw. G. Ragatz Co., San Marino, Calif., a partnership Application July 30, 1951, Serial No. 239,308

11 Claims. (Cl. 196—8)

This invention relates to a method and apparatus for distillation treatment of hydrocarbons, and is generally concerned with accurate control of the separate removal of low-boiling hydrocarbons and intermediate-boiling hydrocarbons from a high-boiling hydrocarbon liquid. An object of the invention is to provide a method and apparatus for effecting a high order of separation of undesired absorbed low-boiling hydrocarbons from desired absorbed intermediate-boiling hydrocarbons in a rich absorption oil prior to distillation-stripping of the rich oil for recovery of said intermediate-boiling fractions.

While the lowest-boiling hydrocarbons recovered in rich absorption oil in the course of absorption treatment of hydrocarbon gases are usually "desired" in the sense that they can be utilized or disposed of as gaseous fuels, in a narrower sense it is customary to refer to such hydrocarbons as "undesired"—in contrast to those higher-boiling hydrocarbons which are desired in the plant liquid products. Because of this usage of terms, I will use the term "undesired" in referring to those low-boiling hydrocarbons which product-specifications partially or wholly exclude from the plant's liquid products, and the term "desired" to refer to those higher-boiling hydrocarbons which are specification-acceptable in said liquid products. As an example, in most current absorption operations methane and ethane fall in the class of "undesired" hydrocarbons, and iso-butane and higher-boiling hydrocarbons fall in the class of "desired" hydrocarbons—while propane may fall partially or wholly in either class, according to the particular plant's liquid product requirements.

In absorption plants handling hydrocarbon gases and operating to obtain higher propane recoveries, it has been found desirable to rectify the raw rich oils for removal therefrom of undesired low-boiling fractions prior to distillation stripping for recovery of desired fractions. Conventionally, such rich-oil rectification operations employ process cycles utilizing a combination of rich-oil rectification and vapor reabsorption equipment in which simple adjustment of the temperature maintained at some convenient point in a hotter section of the rectifying portion of the equipment is relied upon to control the "cut" between desired and undesired components of the rich absorption oil.

While rich-oil rectification cycles employing such temperature controls have proven markedly superior to the older "vapor flash and reabsorption" cycles for handling rich absorption oils of relatively high undesired hydrocarbon content, they often fail to fully meet the needs of absorption plants producing end products incorporating propane and butane fractions in relatively large amounts. Such failures are due, for the most part, to certain fundamental factors or working conditions encountered in the absorption plant operation.

In most absorption plants operating on field-produced rich gas, the composition of the intake gas stream, and hence the composition of the absorbed materials, vary to a substantial degree, in a relatively regular pattern, over a 24 hour cycle. This variation is often notable and significant in the case of the ratios of the propane and lighter fractions to the pentane and heavier fractions recovered in the rich oil.

In order to obtain high recoveries of cuts involving propane and butane fractions, periodic changes must be made in the rich-oil rectifier control to compensate for these periodic variations in absorbed product composition. In practice, these necessary periodic changes in the rich-oil rectifier operation often have such little effect on the temperatures maintained within the apparatus that conventional "temperature control" of some key section of the unit cannot be depended upon for making the equipment-control adjustments required for maximum recovery of the lighter fraction products. On the other hand, the rich-oil rectifier operation is extremely sensitive to changes in the volume of rectifying vapors employed.

By the present invention I obtain effective and accurate control of the rich-oil rectifier operation under periodic composition changes by effecting accurate measurement and control of the volume of rectifying vapors employed at or introduced into the rectifier, rather than by attempting to gain such control by conventional temperature regulation of the equipment.

A general object of the present invention is to provide an improved method and apparatus for removing undesired low-boiling fractions from a rich absorption oil at a rich-oil rectifier wherein precise control is maintained on the quality of the retained absorbed fractions by mechanically measuring and controlling the volume of rectifying vapors employed at said rich-oil rectifier. This mechanical measurement and control may be obtained by aid of conventional flow measuring and valve actuating equipment such as is regularly employed in hydrocarbon processing plants.

Another object of the present invention is to provide a method and apparatus of the general character referred to by which vapors are produced from a fluid from the rectifier, in an amount in excess of that required for introduction into the rectifier, and wherein the vapors in excess of those employed in the rectifier are introduced into a still where liquid-vapor separation is carried out.

Another object of the present invention is to employ a controlled mechanically-measured stream of vapors for the desired rectification operation, which stream is withdrawn from a body of vapor feeding into a rich-oil stripping still.

Another object of the present invention is to produce a vapor supply for flow to the rectifier and still by heating warm rich oil withdrawn from the rectifier with hot lean oil withdrawn from the still.

Another object of the present invention is to effect a high degree of heat recovery from hot lean oil withdrawn from a still by employing heat from such oil for the generation of an excessive supply of vapors for a rectifier; and by thereafter employing heat from such oil to heat a partially rectified stream of rich oil withdrawn from and returned to an intermediate zone of the rectifier.

Another object of the present invention is to provide apparatus including a rectifier and a still and elements carrying out a heat exchange whereby a maximum amount of heat may be recovered from a hot lean-oil stream from the still to generate vapors and to heat fluid at the rectifier, by employment of a minimum number of heat exchangers and without employing complicated and expensive bypasses, valves, controls, systems of lines, etc.

The method of the present invention and the apparatus provided thereby are illustrated diagrammatically in the accompanying drawing wherein the illustration is in the general nature of a flow diagram intended only as an illustrative example of but one simple and typical carrying out of the invention.

The apparatus illustrated is shown as involving, generally, a rich-oil rectifier A constructed to have, in combination, a warm rectifying zone X, a cool rectifying zone Y, and a reabsorption zone Z. Low and high temperature heat exchangers B and C supply heat to the rectifier; and operate in conjunction with a vapor separator D for supplying vapors for flow to the rectifier and to a rich-oil stripping still E.

The still E involves, in combination, a steam stripping zone XX, a rectifying zone YY, and a fractionating zone ZZ for removing desired absorbed products from rectified rich absorption oil. A fired heater F is provided for supplying distillation heat to the stripping still E. An overhead product condenser G and an accumulator H are provided for condensing and handling desired fractions removed from the rectified rich absorption oil at said still. Various other essential interconnecting lines, pumps, and control equipment are provided, as will be hereinafter described.

It is believed that the general nature, as well as the significance of the present invention, both as to method and as to apparatus, will be fully understood from the following detailed description wherein I will explain the flow or action carried out by the invention and will at the same time make reference to the apparatus that I have provided.

In operation, rich absorption oil from a conventional absorber supplied with cool lean oil flowing from the apparatus that I have illustrated is introduced into the rich oil rectifier A at the top of the cooler rectifying zone Y, through a line 1. It will be understood that this so-called "rich oil" is the lean absorption oil from which heat has been extracted in carrying out the present invention, and which has been enriched in a conventional absorber so that it carries the absorbed hydrocarbons that are to be treated.

In the rectifier, the rich oil flows downward through cooler rectifying zone Y over conventional bubble trays, or the like, in counter-current contact with ascending vapors, to the bottom of said cooler zone Y, where it is withdrawn from the rectifier by a line 2. The withdrawn oil is circulated, as by a pump 3, through the low temperature heat exchanger 4, and is delivered in heated condition to the top of the warmer rectifying zone of the rectifier. The heated oil thus returned to the rectifier flows downward in the warmer rectifying zone X over conventional bubble trays, or the like, in counter-current contact with hotter rising vapors flowing upward in that portion of the rectifier.

From the bottom of the warmer rectifying zone X the fully rectified rich oil flows into a compartment 6 in the base of the rectifier, where water which has separated from the rich oil may be withdrawn by means of a conventional interfacial level controller 7 and its motor valve 8.

The rectified rich oil from which the water has been freed or separated overflows a partition 6a to pass from compartment 6 into a compartment 9 in the base of the rectifier A, from which it is withdrawn under control of conventional level controller 10. The delivery of the oil may be through an outlet line 11, and pump 12 may be employed to then circulate the oil through the high temperature heat exchanger C where it is heated sufficiently to produce a relatively large volume of vapors. Heat thus supplied to the rich oil from the rectifier A is from a stream of hot lean oil withdrawn from the still E, and the desired heat transfer is made through heat exchangers C and B.

The heated mixture of oil and vapor from the high temperature heat exchanger C is conducted from the exchanger C to the vapor separator D through a line 14. In accordance with the invention, the rectified rich oil heated by the exchanger C is so handled by the vapor separator D that vapors are obtained therefrom. The remaining liquid stream is then forced from separator D through an outlet line 16 under control of conventional liquid level controller 17 and its motor valve 18, to enter transfer line 19 that delivers it into the rich-oil still E at the top of the rectifying zone YY thereof.

In accordance with the invention a substantially greater quantity of vapors are produced at exchanger C and separated from the rich oil at separator D than is required for the rectification operations at rectifier A. These vapors are conducted from the separator by an outlet line 21, flow from which is then split into two streams, one carried by a line 22 that delivers vapors into the base of the rectifier A, and the other carried by a line 23 that delivers vapors to the rich-oil still E, as through a part of line 19.

The production of a larger quantity of vapors than required for proper operation of rectifier A is essential in order both to assure an adequate supply of vapors for operation of rectifier A, and to effect a high order of heat recovery from the hot lean oil leaving the still when employing only one high-temperature heat exchanger, such as C. As a result, the rectifying vapors returned to the rectifier in accordance with the invention are of a higher-boiling composition than would be the case with a conventional "re-boil" operation employing a conventional temperature control.

Conventional vapor flow-controller 24 is provided to control the quantity of volume of vapors flowing through line 22 into the base of the rich-oil rectifier A. In practice the desired control may be gained by means of a conventional orifice plate 25 located in line 22, and a motor valve 26 located in line 23, which elements are actuated by and are under the control of flow controller 24. Control equipment of this character is widely used in hydrocarbon processing plants.

In accordance with the invention the pressure at separator D is maintained substantially higher than at the stripping still E by back pressure regulator 75, and, through the action of pump 12, just enough higher than in the base of the rectifier A to develop the desired flow of vapors through line 22 and orifice plate 25 into the rectifier base. Since separator D is at a substantially higher pressure than the still E, any excess vapors above those desired for flow to the rectifier may be readily bled off through valve 26 and line 23 into the still E. The relationship just set forth makes possible accurate measurement and control of the volume of vapors introduced into the rectifier, with consequent accurate control of the operation of the rectifier in keeping with the character of feed introduced into the rectifier.

In the diagram I have illustrated, and in the foregoing description I have described a line 23 and a valve 26 handling the excess vapors from separator D. In practice, however, it is not necessary to conduct the excess vapors from the separator separate from the liquids taken from the separator, and therefore the line 16 and valve 18 can be used to handle the entire flow from the separator, other than the vapor flow to the rectifier. Under this condition the controller 24 may be connected to valve 18 to control its operation, and liquid level controller 17, valve 26 and line 23, or the like, may be eliminated.

The liquid portion of the feed stream introduced into the still E through line 19 descends by gravity over a series of bubble cap trays, or the like, to the bottom of the rectifying zone YY. This flow is counter-current to ascending vapors in zone YY, with the result that a suitable rectifying action occurs in zone YY. At the bottom of the rectifying zone YY the resultant liquid is removed from the column through a line 27, and a pump 28 operates to circulate this liquid through the coils 29 of the fired heater F where heat is applied to it, following which it is introduced through an inlet line 30 into the top of the steam stripping zone XX of the still for flow downward over a similar set of trays in this zone against ascending vapors and steam. The liquid from zone YY is heated to such a degree that any remaining desired fractions may be thoroughly stripped from it in zone XX by action of ascending stripping steam, so that the remaining liquid leaving the bottom of the stripping zone XX consists solely of hot lean oil, completely denuded of its absorbed fraction content.

The steam employed in the final stripping action is admitted below the bottom trays in the steam stripping zone XX through a line 32, and is under control of a valve 33. The hot stripped lean oil is withdrawn from the bottom of the still E through a line 54 under control of conventional level controller 55, and its motor valve 56.

In accordance with the invention the hot lean oil flows from the still to the interchanger C without intervening heat exchange, and it may so flow either under stripping-still pressure or by appropriate pump action through a line 57 that extends from valve 56 to the heat exchanger C.

The heat exchanger C is of such size and heat transferring capacity that the hot lean oil from the still E so heats the rectified rich oil from the rectifier A that the rich oil handled by the separator D supplies vapors in excess of those required for delivery to the rectifier, and the excess vapors and the remaining liquid are delivered to the still. As a result of this, the flow returned to the rectifier is a flow of vapors whereas the flow from the rectifier to the heat exchanger C is primarily liquid, and varies greatly in character from the said vapor flow.

After the desired flow through, and exchange of heat in, the heat exchanger C, the warm lean oil flows, or may be pumped, through a line 58 to the exchanger B, where heat is transferred from it to liquid drawn from and reintroduced into the rectifier, as hereinabove described.

The initial extraction of heat from the hot lean oil from the still E to produce an excess of vapors, as above described, and the further extraction of heat from that oil by heating liquid handled by or in the rectifier, results in a substantial removal of heat from the lean oil, with corresponding efficient employment of that heat in the process.

After circulation through exchanger B, the lean oil is made ready for re-use in the absorber from which the rectifier is fed, by passage of the lean oil through a cooler 59.

After reduction of temperature at cooler 59 the cold lean oil may, in accordance with conventional practice, be pumped back to, or over, the absorption column or columns from which the rich absorption oil is derived, and to, or over, the reabsorption zone of the rich-oil rectifier A.

The vapors bled through valve 26 to still E, together with ascending vapors leaving the top rectifying zone YY in still E, ascend through the fractionating zone ZZ of the still in conventional counter-current flow against reflux liquid introduced into the top of the fractionating zone by a pump 60 through a line 61. At the top of fractionating zone ZZ the remaining vapors are withdrawn through outlet 62 and conducted by a line 63 through a back-pressure control valve 64 to a product condenser 65, where they are normally accumulated as a totally condensed "desired" liquid under the pressure and temperature conditions there maintained. Water introduced into the still E, as above described, may be removed from the upper portion of the fractionating zone ZZ by a conventional water separator and valve unit 66, and from the product accumulator H via water draw-off line and valve assembly 67. The condensed fractions, free of water, are taken from the accumulator H through a line 69.

Reflux required for the still operation is conducted from the product accumulator H by a line 68 connected to line 69 and extending to the suction side of a feed pump 69, from whence it is fed to the top of the still. The net rectified liquid product is withdrawn through line 69 under control of a conventional liquid-level controller 70 and motor valve 71. This liquid product constitutes the combined "desired" absorbed product, and may subsequently be fractionated into desired separate finished cuts at one or more conventional fractionating columns.

The rejected undesired components of the rich-oil feed stream leave the top tray of cool rectifying zone Y in vapor form, along with a substantial quantity of desired vapor fractions. These vapors combine with any separated vapors from the entering feed stream for upward flow through reabsorber zone Z in counter-flow to cold lean oil introduced into the top of said zone. Reabsorption zone Z may be equipped with conventional bubble-cap trays, or the like, and through the counter-current contacting action effected thereby, desired components of the vapor stream may be recovered in the descending stream of absorption oil for return to cooler rectifying section Y for processing along with the incoming rich-oil feed, as hereinbefore described, while the "undesired" fractions leave the top of reabsorption zone Z in vapor form, via line 74, under control of conventional back-pressure regulator 75.

The method of the invention may be employed to advantage in rich-oil rectifying operations in which the rich-oil rectifier A operates at a higher pressure than the stripping still E, and in such operations the rectifier pressures may range from 100 to something over 200 pounds gauge, while the still pressures range from 60 to something over 150 pounds gauge. Within these pressure ranges the rectified rich-oil temperatures may range from 200° to 425° Fahrenheit, the overhead temperatures at the stripping still E may range from 185° to 250° F., and the still bottom's temperatures may range from 350° to 575° F. The temperature of the oil leaving the second or low-temperature heat exchanger B may be within some 30° to 50° F. of the temperature of the rich-oil feed to rectifier A, which may range from 80° to 120° F.

Over-all control of the rectifier A may be obtained by proper balancing of the quantity of lean oil introduced into the top of the reabsorption zone Z of the rectifier A through control valve 73, as determined by a suitable flowmeter 72, with the volume of rectifying vapors introduced into the bottom of the warmer rectifying zone X, as determined and controlled by the flow controller 24. By proper adjustment or balancing of these liquid and vapor streams while there is unrestricted or unregulated introduction of heat from the hot lean oil through, or by means of, low and high temperature heat exchangers B and C, it is possible to make a sharp cut between a maximum of the fractions which it is desired to retain in the rectified rich oil leaving the bottom of the rectifier, and the undesired, lower-boiling fractions discarded from the top of the rectifier through line 74 and back pressure control valve 75.

Over-all control of the rich-oil still E can be gained by appropriately relating the action of the heater F with the introduction of stripping steam to the bottom of the still and the flow of reflux to the top of the still.

The desired control or regulation of the heater F can be gained by adjustment of the heater fuel supply, as by relating the supply of fuel to the heater to the temperature of the stream heated by the heater. This may be done by means of a conventional temperature controller 76 actuated by thermocouple 77 in line 30 and operating a control valve 78. The flow of stripping steam into the bottom of the still E can be easily regulated by operation of control valve 33, and the flow of reflux to the still can be readily regulated by governing the feed pump 60—with both streams being measured by conventional orifice meter installations, or the like.

With the above described "three point" still control, the quantity of steam utilized is normally set at a fixed rate, based on experience, after which the still temperature and reflux rates are mutually adjusted to effect a sharp cut between desired absorbed overhead product and hot lean oil withdrawn from the still base.

When starting new equipment in operation, or when confronted with a marked change in quality of the rich absorption-oil feed to the rectifier, proper balancing or operation of the controls at both the rectifier and still can be obtained by the withdrawing and analyzing of appropriate samples, which operation is then suitably related to working of the equipment controls, as hereinbefore described.

After the basic settings or regulations of the controls have been established, secondary or minor control adjustments must be made from time to time to compensate for minor changes in quality and/or quantity of the rich absorption-oil feed to the rectifier, or to compensate for other variables. Of such adjustments, secondary changes in the volume of vapors employed in the rectifying zone X of the rectifier are particularly effective for maintaining accurate control of the qualities of end products produced, and this is particularly true of those involving propane and butane fractions. Such changes in volume of vapor introduced into the rectifier, though highly essential for maximum recovery of narrow-specification products, may often be effected with little or no corresponding effect on the temperatures maintained at or in the rectifier. Under such circumstances, accurate control of the volume of vapor introduced into the rectifier by direct mechanical measurement of said vapor volumes results in materially higher yields of specification-quality products than can be attained with the relatively non-responsive conventional reboiling temperature controls.

In using the terms "mechanically measured" or "measured mechanically" I mean, or refer to, an operation in which the volume flow of vapors is measured accurately and directly by an orifice plate, or the like, interposed in the line conducting the vapor to the rectifier, as distinguished from an indirect, indefinite determination of the vapor flow, as by, or as a result of, a temperature measurement, or the like.

It is to be understood, of course, that an orifice plate, or the like, used in a mechanical measurement such as I refer to may, in practice, be supplemented by differential pressure indicating or recording devices which can be calibrated to accurately and directly indicate the rate of vapor flow through the line.

While it is normally most convenient to effect the control of the rectifier vapor volumes by direct mechanical measurement of the vapors entering the base of the rectifier, it will be obvious that if the opportunity or necessity should arise, a comparable measurement could be made of the vapor volumes at some intermediate point within the rectifier, between the rectifying and reabsorption zones, or even out of the top of the reabsorption zone.

Having described only a typical preferred manner of carrying out the method of my invention, and only a typical form of apparatus of my invention, I do not wish to be limited or restricted to the specific details herein set forth, but wish to reserve to myself any variations or modifications that may appear to those skilled in the art and fall within the scope of the following claims.

Having described my invention, I claim:

1. The method of removing low-boiling hydrocarbons from a higher-boiling hydrocarbon product in a rich absorption oil and maintaining precise control of the composition of said product including, introducing said rich oil into a rectifying zone, removing low-boiling hydrocarbons from said zone, withdrawing rectified rich oil from said zone, heating said withdrawn oil sufficiently to vaporize a portion of the absorbed hydrocarbons, separating vapors from the heated oil, returning resultant separated vapors to the rectifying zone, measuring the flow of said returned vapors, passing the separated heated oil (together with any vapors not returned to the rectifying zone) to a distillation zone, removing said higher-boiling hydrocarbon product from said distillation zone, and controlling the composition of said product by adjusting the measured flow of said vapors returned to said rectifying zone.

2. The process of claim 1 wherein the vapors generated by said heating of the rectified rich oil are in excess of those returned to the rectifying zone.

3. The method as in claim 1 wherein the vapors withdrawn from the rectifying zone are introduced into an absorption zone, and rich oil from said absorption zone is introduced into said rectifying zone.

4. The method as in claim 1 wherein hot lean oil is withdrawn from said distillation zone and passed in indirect heating relationship with the rectified rich oil to effect said vaporization of a portion of the absorbed hydrocarbons.

5. The method as in claim 1 wherein hot lean oil is withdrawn from said distillation zone, passed in indirect heat exchange with the rectified rich oil to vaporize a portion of the absorbed hydrocarbons, and is then passed in indirect heat exchange with rich absorption oil at an intermediate section of said rectifying zone.

6. The method of removing low-boiling hydrocarbons from a higher boiling hydrocarbon product in a rich absorption oil including, introducing said rich oil into a rectifying zone, withdrawing lower boiling hydrocarbon vapors from said zone, withdrawing rectified rich oil from said zone, heating said rectified oil sufficiently to evolve additional vapors therefrom, separating said evolved vapors from the heated oil and introducing the remaining heated oil into a distillation zone, dividing said evolved vapors and introducing one portion thereof into the said rectification zone, and introducing the balance of said evolved vapors into said distillation zone, regulating the rate of flow of said vapors to the distillation zone to limit the rate of flow of divided vapors into said rectification zone.

7. The method of claim 6 wherein the low-boiling vapors withdrawn from said rectifying zone are introduced into an absorption zone, and rich oil from said absorption zone is introduced into said rectifying zone.

8. The method of claim 6 wherein hot lean oil withdrawn from said distillation zone is employed as an indirect heating agent for the said heating of the rectified rich oil, and is then passed in indirect heat exchange with rich absorption oil at an intermediate section of said rectifying zone.

9. An apparatus for separating low-boiling hydrocarbons from a higher-boiling hydrocarbon product contained in a rich absorption oil, which comprises a rectifying column, means for introducing rich absorption oil into said column, means for removing low-boiling hydrocarbons from the top of the column, a line for withdrawing oil from the bottom of the column, a heat interchanger in said line capable of raising the temperature of the withdrawn oil sufficiently to vaporize higher-boiling absorbed hydrocarbons, means for separating vapors from the remaining oil, means for measuring the flow of said vapors, means for returning separated vapors to the rectifying column, a distilling column, means for passing said separated oil and any vapors not returned to the rectifying column to the distilling column, means for removing a higher-boiling hydrocarbon product therefrom, and means for recovering it, means for withdrawing lean oil from the base of the distilling column and passing it to said heat interchanger, and means for controlling the rate of flow of said separated vapors to said rectifying column whereby to effect precise control of the composition of the product.

10. Apparatus of the character described including, a rectifier defining a rectifying zone and an absorption zone, means for supplying rich absorption oil to the rectifying zone, means for supplying lean absorption oil to the absorption zone, a heat exchanger, means for conducting rectified oil from the rectifying zone to the heat exchanger, a separator for receiving heated oil from the heat exchanger, a still, means for passing vapor from the separator to the rectifying zone, a regulator controlling the flow of said vapor including a vapor flow-measuring means, means for passing the separated oil (together with any vapors not delivered to the rectifying zone) to the still, means for supplying heat to the still, and means for circulating hot oil from the still to the heat exchanger to there act as a heating agent.

11. Apparatus of the character described including, a rectifier defining a rectifying zone and an absorption zone, means for supplying rich absorption oil to the rectifying zone, means for conducting rich absorption oil from the rectifying zone, heating it, and returning it to the rectifying zone and including a heat exchanger, means for supplying lean absorption oil to the absorption zone, a heat exchanger, means for conducting rectified oil from the rectifying zone to the last said heat exchanger, a separator for receiving heated oil from last said heat exchanger and, a still, means for passing vapor from the separator to the rectifying zone, and a regulator controlling the flow of said vapors including a vapor flow-measuring means, means for passing the separated oil (together with any vapors not delivered to the rectifying zone) to the still, means for supplying heat to the still, and means for circulating hot oil from the still to the heat exchangers to there act as a heating agent.

EDWARD G. RAGATZ.

(References on following page)

References Cited in the file of this patent

UNITED STATES PATENTS

| Number | Name | Date |
|---|---|---|
| 1,713,323 | Bernard | May 14, 1929 |
| 2,169,959 | Brandt | Aug. 15, 1939 |
| 2,357,113 | Houghland et al. | Aug. 29, 1944 |
| 2,367,284 | Kaplan | Jan. 16, 1945 |
| 2,468,750 | Gudenrath | May 3, 1949 |
| 2,547,970 | Phillips et al. | Apr. 10, 1951 |
| 2,548,058 | Ragatz | Apr. 10, 1951 |
| 2,564,791 | Ribble | Aug. 21, 1951 |
| 2,608,516 | Miller | Aug. 26, 1952 |

OTHER REFERENCES

Harts, "The Oil and Gas Journal," October 29, 1942, pages 59–62, 64, 65.

Anonymous, "The Oil and Gas Journal," vol. 48, pages 91, 92, 98–100, November 24, 1949.

Middlebrook, "The Oil and Gas Journal," vol. 49, pages 85–87, 107–108, December 7, 1950.